United States Patent
Lupher et al.

(10) Patent No.: US 9,110,295 B2
(45) Date of Patent: Aug. 18, 2015

(54) SYSTEM AND METHOD OF CONTROLLING DISCHARGE OF A FIREARM

(75) Inventors: John Hancock Lupher, Austin, TX (US); John Francis McHale, Austin, TX (US)

(73) Assignee: TrackingPoint, Inc., Pflugerville, TX (US)

(*) Notice: Subject to any disclaimer, the term of this patent is extended or adjusted under 35 U.S.C. 154(b) by 0 days.

(21) Appl. No.: 13/384,338

(22) PCT Filed: Feb. 16, 2011

(86) PCT No.: PCT/US2011/000281
§ 371 (c)(1),
(2), (4) Date: Aug. 10, 2012

(87) PCT Pub. No.: WO2011/102894
PCT Pub. Date: Aug. 25, 2011

(65) Prior Publication Data
US 2012/0297658 A1    Nov. 29, 2012

Related U.S. Application Data

(60) Provisional application No. 61/338,203, filed on Feb. 16, 2010.

(51) Int. Cl.
| | | |
|---|---|---|
| F41A 19/58 | (2006.01) | |
| F41A 19/00 | (2006.01) | |
| F41G 1/387 | (2006.01) | |
| G02B 23/00 | (2006.01) | |
| F41A 17/06 | (2006.01) | |

(Continued)

(52) U.S. Cl.
CPC .............. *G02B 23/145* (2013.01); *F41A 17/06* (2013.01); *F41A 19/10* (2013.01); *F41A 19/58* (2013.01); *F41A 27/30* (2013.01); *F41C 27/22* (2013.01); *F41G 1/38* (2013.01)

(58) Field of Classification Search
CPC ......... F41A 17/06; F41A 19/10; F41A 19/58; F41A 27/30; F41C 27/22; F41G 1/38; G02B 23/145
USPC ............. 42/70.06, 70.09, 119, 122, 130, 131; 89/134, 41.03, 41.05, 41.17
See application file for complete search history.

(56) References Cited

U.S. PATENT DOCUMENTS

| | | | |
|---|---|---|---|
| 953,279 A | * | 3/1910 Moore | .......................... 42/70.01 |
| 4,370,914 A | * | 2/1983 Voles | ........................... 89/41.05 |

(Continued)

FOREIGN PATENT DOCUMENTS

EP    0898144 A2    2/1999

OTHER PUBLICATIONS

International Search Report, International Application No. PCT/US2011/000281, Nov. 25, 2011.

(Continued)

*Primary Examiner* — Bret Hayes
(74) *Attorney, Agent, or Firm* — Cesari & Reed LLP; R. Michael Reed

(57) ABSTRACT

A method includes defining a designation point on a target within a view area of a scope coupled to a firearm and determining an angular motion deviation of a muzzle of the firearm from the designation point. The method further includes initiating firing of the firearm when the angular motion deviation is below an acceptable level.

18 Claims, 6 Drawing Sheets

(51) Int. Cl.
*F41A 19/10* (2006.01)
*F41A 27/30* (2006.01)
*F41C 27/22* (2006.01)
*F41G 1/38* (2006.01)

(56) References Cited

U.S. PATENT DOCUMENTS

| | | | |
|---|---|---|---|
| 4,787,291 A | 11/1988 | Frohock, Jr. | |
| 5,280,744 A * | 1/1994 | DeCarlo et al. | 89/41.19 |
| 6,237,271 B1 * | 5/2001 | Kaminski | 42/70.06 |
| 6,823,621 B2 * | 11/2004 | Gotfried | 42/70.06 |
| 6,843,014 B1 * | 1/2005 | Aponte et al. | 42/70.06 |
| 6,856,238 B2 * | 2/2005 | Wootton et al. | 340/5.61 |
| 6,871,439 B1 | 3/2005 | Edwards | |
| 6,886,287 B1 | 5/2005 | Bell et al. | |
| 7,055,276 B2 | 6/2006 | McPherson | |
| 7,089,844 B2 | 8/2006 | Becker | |
| 7,404,268 B1 | 7/2008 | Page | |
| 8,172,139 B1 | 5/2012 | McDonald et al. | |
| 2004/0099134 A1 | 5/2004 | Gotfried | |
| 2005/0268521 A1 * | 12/2005 | Cox et al. | 42/130 |
| 2006/0005447 A1 | 1/2006 | Lenner et al. | |
| 2007/0234626 A1 | 10/2007 | Murdock et al. | |
| 2008/0039962 A1 * | 2/2008 | McRae | 700/90 |
| 2012/0037702 A1 * | 2/2012 | Kude | 235/407 |
| 2012/0159833 A1 * | 6/2012 | Hakanson et al. | 42/131 |
| 2012/0314283 A1 | 12/2012 | Jahromi | |

OTHER PUBLICATIONS

Brochure, Trijicon Combat Optics, CCAS Continuously Computed Aiming Solution, PML 4032 Rev(0), 2013, 5 pages.
European Search Report, PCT/US2011000281, Oct. 27, 2014.

* cited by examiner

SYSTEM AND METHOD OF CONTROLLING DISCHARGE OF A FIREARM

CROSS-REFERENCE TO RELATED APPLICATION(S)

This application is a national stage application of International Patent Application No. PCT/US2011/000281, filed on Feb. 16, 2011 and entitled "Advanced Firearm or Air Gun Scope", which is incorporated herein by reference in its entirety and which application is a non-provisional of and claims priority to U.S. Provisional Application No. 61/338,203, filed Feb. 16, 2010, which is also incorporated herein by reference in its entirety.

FIELD

This description relates to ballistic muzzle tracking and related devices, and especially to telescopic ballistic sights to achieve medium and long-range accuracy in the presence of normal human tremor.

BACKGROUND

Shooting a firearm or air gun device accurately requires that many variables be taken into consideration—human steadiness or lack thereof, angle of shot (uphill or downhill), distance, bullet ballistic information (velocity, sensitivity to wind), and wind speed all affect the accuracy of a given shot. The problem is that there is no way for most shooters to integrate or eliminate all of these variables and make an accurate shot. This is particularly true for shots beyond 200 yards and shots at smaller targets. As a result, shots between 200 yards and 500 yards are rarely completed successfully. A typical shooter will introduce human jitter and trigger jerk somewhere between 2 and 15 minutes of angle (MOA). At 500 yards, a shooter could miss the target by up to 75 inches or more.

The issue of human steadiness is a critical one and has been addressed in the prior art. Most solutions tend to be approaches that involve the active stabilization of the rifle. An example is EP0898144 B1 in which, during a tracking mode, undesired motion is sensed by position sensors and the information is fed to inertial rate sensors make the barrel relatively immune to movement of the stock to facilitate the barrel remaining sighted on the tracked target. U.S. Pat. No. 7,055,278 describes a damper system for reducing vibrations during and after firing, that involves adding damper weights to the firearm. Similarly, PCT application WO8102925 A1 describes a rifle with a stabilizing structure that receives the arm of the user so that forces are exerted upon the stabilizing structure by various surfaces of the shoulder or upper arm of the shooter. These design elements result in resistance to translational movements and rotational movements about any set of three mutually perpendicular axes.

All of these approaches might be termed as active stabilization of the rifle. They may help reduce tremor but can involve specially designed rifles or significantly cumbersome additions to known rifles.

There is a need for a different approach, one that can be applied to a wide variety of firearm or air gun devices, and that does not require cumbersome additions to the firearm or air gun devices. This is achieved in this description by using not active rifle stabilization but attitude tracking coupled with firing synchronization.

SUMMARY

The above identified needs are met by a method for using a firearm or air gun sighting scope for automated compensation of human unsteadiness during firing of firearms or air guns including at least the steps of: aiming the firearm or air gun on a desired target and initiating action to create a designation point and activate muzzle tracking; initiating firing of the firearm or air gun device, which fires only when the angular motion deviation of the firearm or air gun muzzle from the angular position designation point are below an acceptable level.

In another aspect of the method the designation point remains fixed in the field of view.

In another aspect of the method, a trigger pull is resisted or inflated while the angular motion deviations of the firearm or air gun muzzle from the angular position designation point are above an acceptable level.

The above identified needs are also met by a firearm or air gun sighting scope system for automatic compensation of human unsteadiness during firing of firearms or air guns using an angular position designation point including at least: a muzzle tracking module wherein said muzzle tracking module tracks angular motion deviations of the firearm or air gun muzzle from the angular position designation point; a synchronized trigger mechanism that enables firing of the firearm or air gun when the angular motion deviations of the firearm or air gun muzzle from the angular position designation point is below an acceptable level and prevents or impedes firing when the angular motion deviation of the firearm or air gun muzzle from the angular position designation point is above the acceptable level.

In another aspect the muzzle-tracking module of the firearm or air gun sighting scope system includes at least an image sensor, an inclinometer; and gyroscopes.

In another aspect the synchronized trigger mechanism of the firearm or air gun sighting scope system includes at least a solenoid to prevent firing when angular deviation of the muzzle from the angular position designation point is above an acceptable level.

In another aspect the synchronized trigger mechanism of the firearm or air gun sighting scope system includes at least a nitinol wire variable force trigger to prevent firing when angular deviation of the muzzle from the angular position designation point is above the acceptable level.

In another aspect the synchronized trigger mechanism of the firearm or air gun sighting scope system includes at least a safety switch to prevent firing when angular deviation of the muzzle from the angular position designation point is above an acceptable level; an electrically activated primer; a bolt with an internal electrical contact for electrical connection to the electrically activated primer; and an electronic activation circuit for activation of the electrically activated primer.

In another aspect the firearm or air gun sighting scope system for automatic compensation of human unsteadiness during firing of firearm or air gun devices also includes at least an automatic ballistics cross-hair that is computationally generated and automatically re-positioned in the field of view based on target range, bullet ballistics, wind, and muzzle incline/decline.

BRIEF DESCRIPTION OF THE DRAWINGS

In order that the invention can be more clearly ascertained examples of preferred embodiments will now be described with reference to the accompanying drawings wherein.

DETAILED DESCRIPTION OF ILLUSTRATIVE EMBODIMENTS

Figure 1:
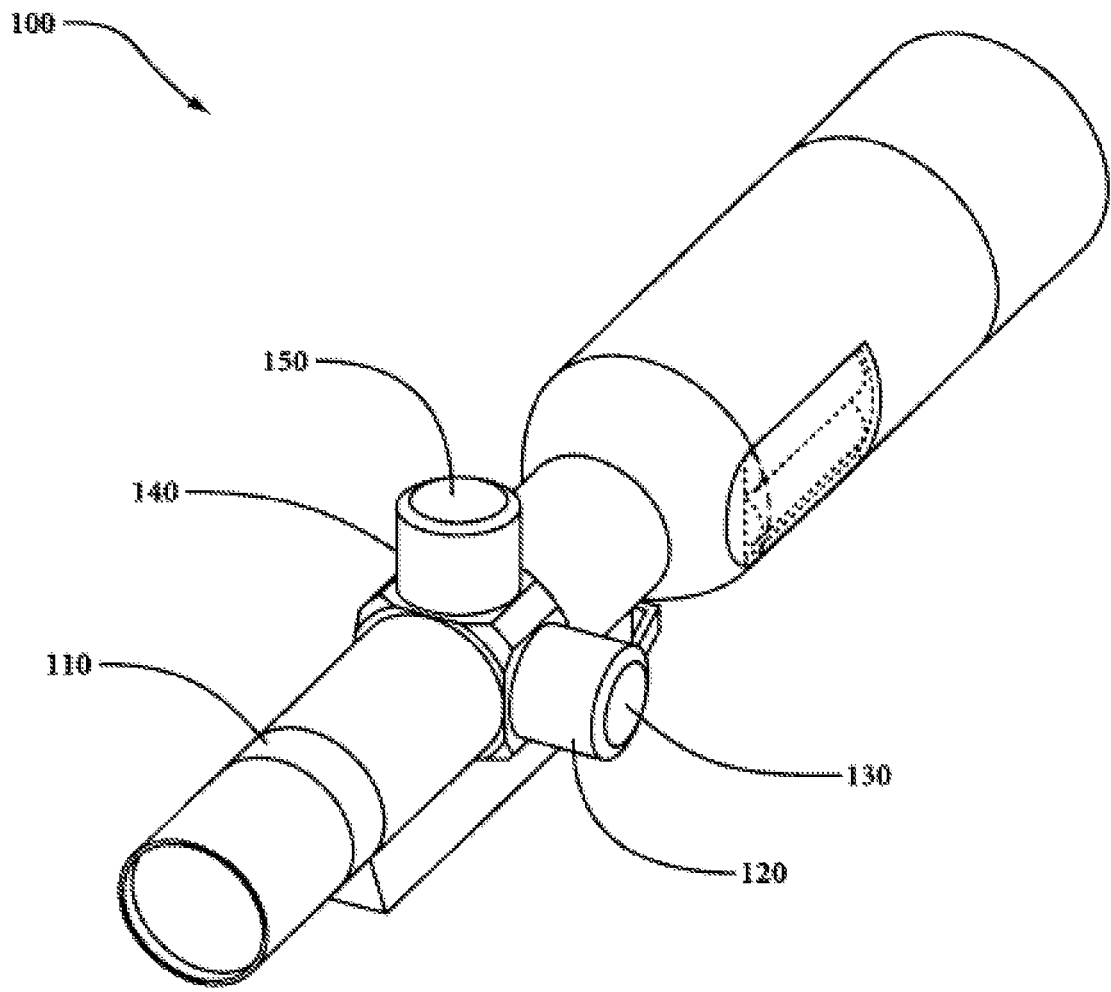
FIG. 1 is a rendering of an embodiment of the firearm or air gun sighting scope.

FIG. 1 is an illustration of an embodiment of the firearm or air gun sighting scope 100. It appears very similar to other scopes but has very different functionality. An elevation knob 140 has an electronic button 150. A windage knob 120 also has an electronic button 130. As in other scopes an optical zoom adjustment is shown as 110.

Figure 2:
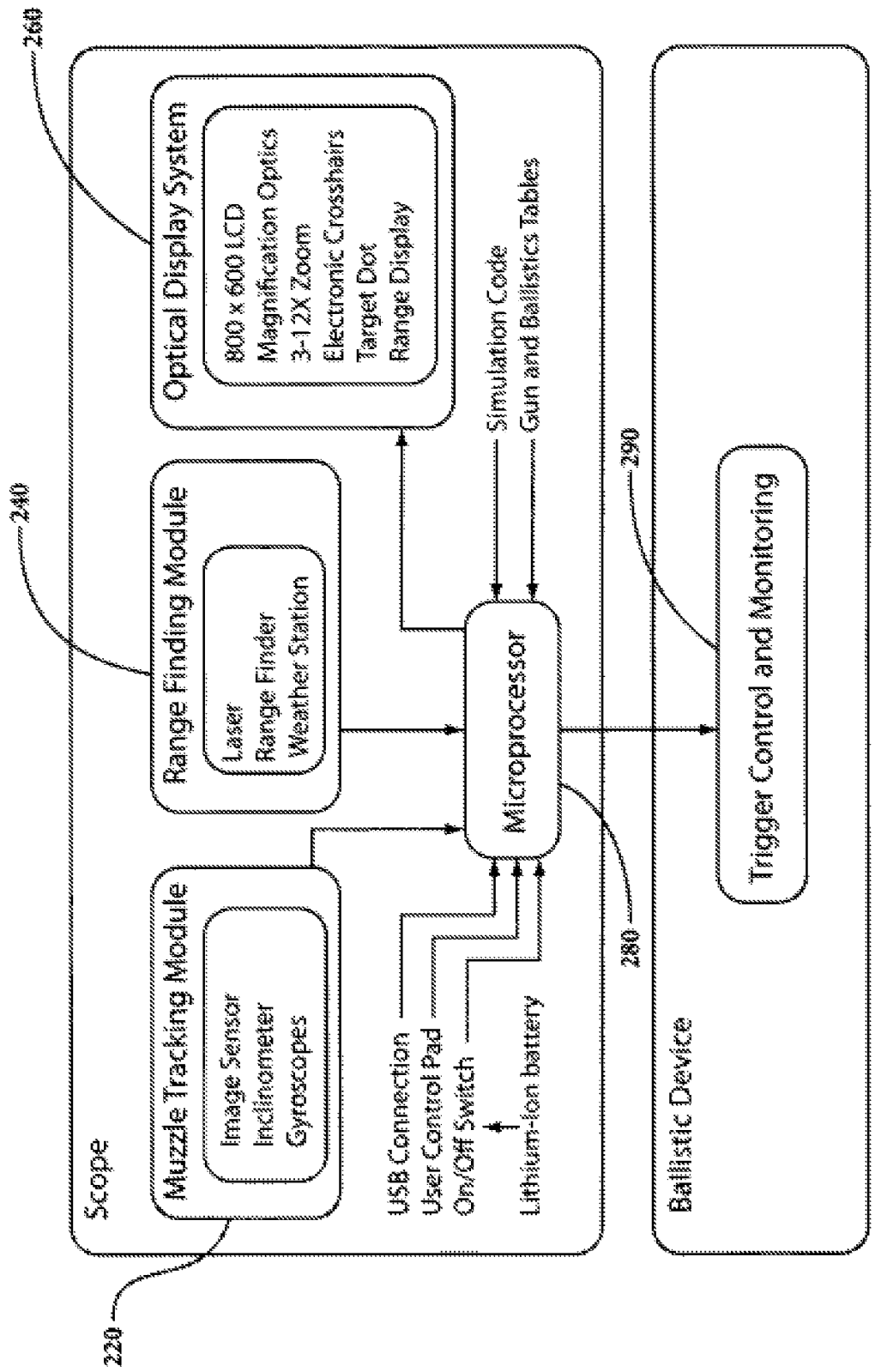
FIG. 2 is a schematic of functional subsystems of the firearm or air gun sighting scope system.

The complete firearm or air gun sighting scope system can be broken into two parts: a scope and a ballistic device. FIG. 2 is a schematic representation of the subsystems with the two major parts shown as the advanced intelligent firearm or air gun scope (Scope) in the top half of the representation that provides all of the functionality of attitude tracking, and the Trigger Monitoring and Control (TMC), represented in the bottom half (Ballistic Device) that provides firing synchronization.

The proposed scope has three major components—a muzzle-tracking module (MTM) 220, a range finding module 240 and an optical display system 260. The muzzle-tracking module contains an array of gyroscopes and an image sensor for muzzle position tracking and an inclinometer to determine a shot angle relative to gravity. All of these feed into a core microprocessor 280 with embedded software that provides the intelligence for the system. All of the microprocessor capability can be supplied with one central microprocessor as shown or that capability could be split between the various modules.

Figure 3:
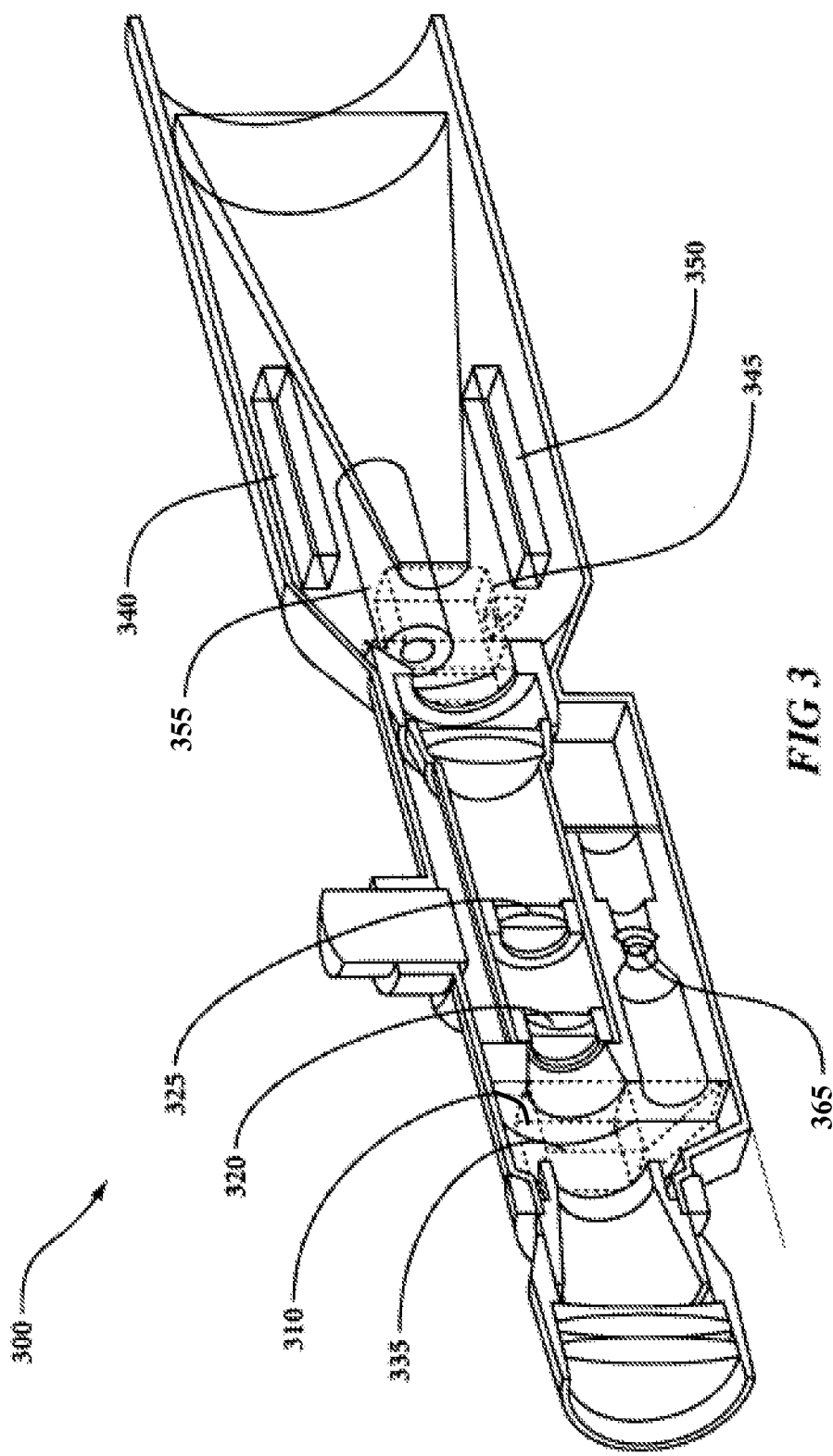
FIG. 3 is a cutaway view of an embodiment of the firearm or air gun sighting scope.

FIG. 3 is a rendering of the internals of the firearm or air gun sighting scope 300. Range finding module 240 uses a "time of flight" laser range finding approach. An off axis infrared laser 350 generates light that is reflected using beam splitters 345 into the scope optical path toward the target. Laser light is emitted in timed pulses that illuminate the target. The returning reflection from the target is detected by an avalanche photodiode receiver 340 and the time delay is measured to with 1 nanosecond. This time of flight is used to determine the distance to the target.

The scope also contains an optical display system 260. It is built around a zoom power scope with zoom lenses 320, 325 that typically give a 3×-12× power range but is not limited to that. The sighting scope also includes a display beam splitter 335, and an image sensor 310. Power is supplied by an internal battery 355. The invention anticipates that the scope can be a video (camera) scope or a natural light scope. The optical system projects the reticle, range and configuration screens onto a display 365 in the field of view. One aspect of the optical display system is the capability of the shooter to initially position the horizontal and vertical reticles (crosshair) on a potential target and press the shot control button 130 on the windage knob 120 (see FIG. 1) to illuminate a colored dot or designation-dot that represents the desired designation point on the target. This is used in shot simulation, muzzle tracking, and trigger synchronization to be described later Trigger control and monitoring 290 is separate from the scope, as shown in FIG. 2. The proposed scope can mount on any firearm or air gun device, including various rifles and bows. However, to utilize the scope shot stabilization capability the firearm or air gun device must be specially modified with Trigger Monitor and Control (TMC) capability.

Figure 4:
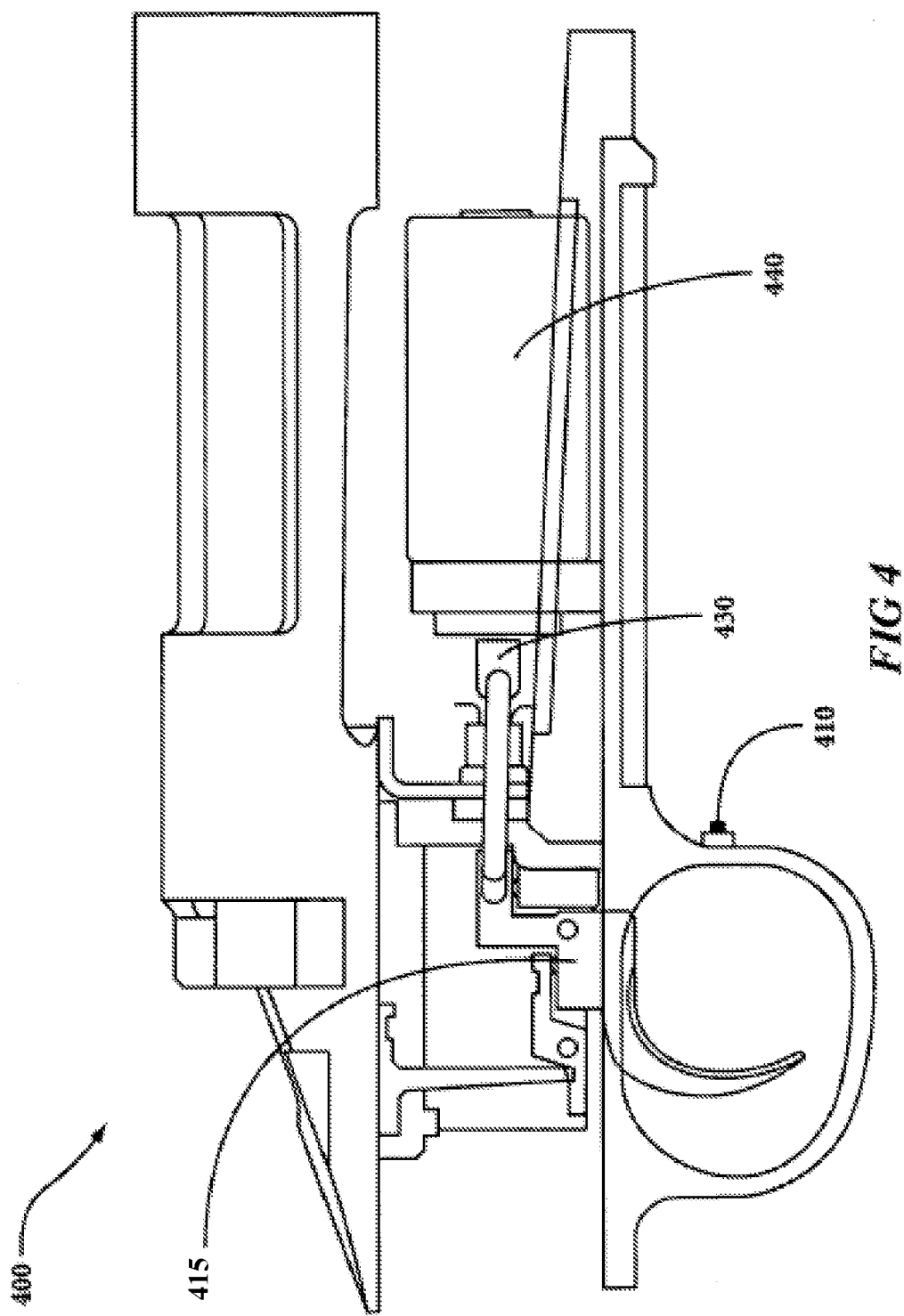
FIG. 4 is a rendering of a trigger control embodiment.

One embodiment of the TMC capability in shown in FIG. 4 as system 400 which includes 1) a solenoid 440 with proximity switch 430 that functions to restrict firing when off target, and 2) internal wiring and connector to connect the solenoid to the scope. The TMC includes a two state trigger 415 and shot control switch 410. The mechanism increases the trigger pull force when the solenoid is activated from normal trigger pull force of approximately 2 lbs to a restricting force of about 8 lbs. If the shooter applies more than 8 lbs of force to the trigger, he may fire in spite of the solenoid's restricting force.

Figure 5:
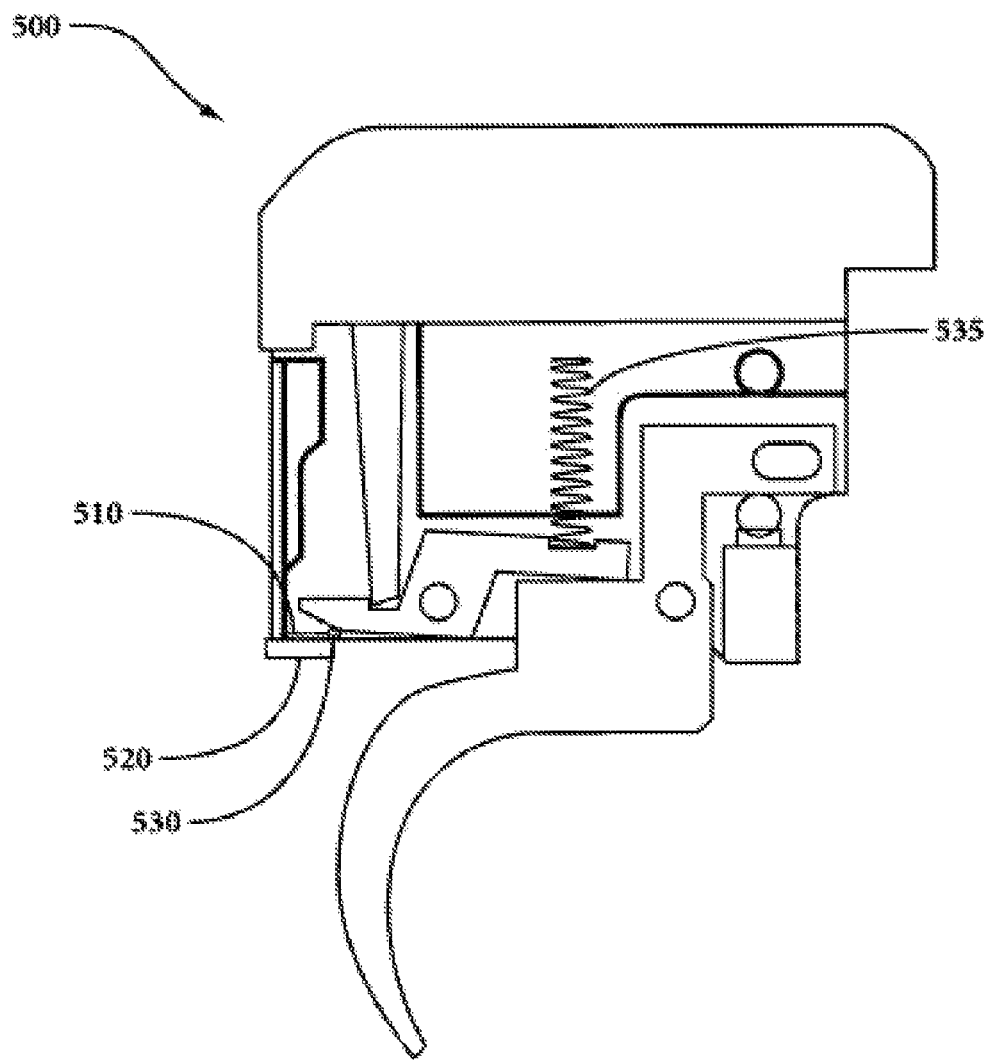
FIG. 5 is a rendering of another trigger control embodiment.

A second embodiment of the TMC capability, shown in FIG. 5 as system 500 is a nitinol wire variable force trigger, which consists of 1) a nitinol wire retractor 510, 2) a wedge pin 530, 3) a cantilever spring 520, and 4) a trigger spring 535. This mechanism increases the trigger pull force when the wedge pin is moved between the cantilever spring and trigger sear. When the wedge pin is in place, the trigger pull force of approximately 2 lbs inflates to a restricting force of about 8 lbs. If the shooter applies more than 8 lbs of force to the trigger, he may fire in spite of the spring's restricting force.

A third embodiment of the TMC (not shown) consists of an electric trigger system consisting of a safety switch, a 2 lbs switch and an 8 lbs switch on the trigger, an electrically activated primer for discharging the firearm, a bolt with an internal electrical contact for electrical connection to the primer and an electronic activation circuit for activation of the primer. This circuit performs the same functions typical of a trigger design, including monitoring the safety switch and trigger switches. A trigger pull of 8 lbs or more will fire the gun, and a trigger pull of 2 lbs or more but less than 8 lbs will fire the gun only if the gun is aligned with the designation point.

The scope has three primary capabilities: a direction designation method such as a Shot Simulator, a muzzle tracking method such as the Muzzle Tracking Module to measure angular motion deviations from the designated direction, and a synchronized firing method such as the Trigger Monitor and Control mechanism. Each is described below.

Shot Simulator—

The proposed scope allows the shooter to quickly and automatically simulate a shot before firing. When the shooter aligns the reticle on a desired target and presses the shot control button on the windage knob, a colored dot (designation-dot) appears in the field-of-view where the horizontal and vertical reticles cross (cross-hair). This designation dot or designation point represents the muzzle position at designation time and simulates the point of impact should the shooter pull the trigger. If the shooter is satisfied with the impact point as marked by the designation-dot, he pulls the trigger while endeavoring to keep the cross-hair on the designation-dot.

If the shooter is not satisfied with the designated impact point, he attempts to realign the cross hair with his intended impact point, and presses the shot control button again, at which time the designation-dot reappears. The shooter can repeat the simulation multiple times until he is satisfied with the impact point indicated by the designation-dot.

Muzzle Tracking—

As natural shooter jitter occurs, the cross-hair will move off the simulated point of impact but the designation-dot or designation point will stay fixed with the field of view. This is done by continually monitoring and processing the field-of-view image. Movement in the image represents the rate and direction of muzzle movement. The muzzle-tracking module continuously tracks angular motion deviations of the muzzle from the angular position designation point. Using kinematic equations, the microprocessor can then predict when the muzzle will re-intersect the designation point. These kinematic equations take into account angle and direction of muzzle movement and the time it takes for the firing-pin to strike and launch the bullet.

Shot Synchronizer—

If the Shot Synchronizer is in use, the trigger pull will be resisted or inflated while the angular motion deviations of the muzzle from the angular position designation point are above an acceptable level, but the trigger resistance will relax or deflate when the cross-hairs approach the designation-dot and the deviation of the muzzle from the angular position designation point are 30 below an acceptable level. This enables firing of the firearm or air gun when the angular motion deviation of the firearm or air gun muzzle from the angular position designation point is at an acceptable level and prevents or impedes firing when the angular motion deviation of the firearm or air gun muzzle from the angular position designation point is above the acceptable level. If the Shot Synchronizer is not in use, the trigger will release when the normal trigger pull-force has been exceeded.

A typical shooter will introduce human jitter and trigger jerk somewhere between 2 and 15 minutes of angle (MOA). At 500 yards a shooter could miss the target by up to 75 inches or more. The Shot Synchronizer limits the impact of human jitter and trigger jerk to 0.8 MOA which is about 4 inches at 500 yards. This type of accuracy is attainable even if the shooter is firing "off-hand" without a gun rest. The Shot Synchronizer works in conjunction with the Shot Simulator. When the Shot Synchronizer is in use, an actuator in the trigger inflates the trigger pull force (to approximately 8 lbs.) to restrict firing. When the cross-hair intersects the designation-dot the actuator releases and normal trigger pressure (2 to 3) pounds is overridden by the shooter and the shot is fired.

In addition to these primary functions the proposed scope has the following additional embodiments:

Built-in Range-Finder—

The firearm or air guns scope has an embedded laser range finder. A laser diode generates a beam of light that is projected out through the scope through a beam splitter. The range finder can operate to 800 yards with an accuracy of +/−1.5 yard. The range finder can be activated in two ways. With rifles that include the trigger control and monitoring system 290, the range finder can be activated by pressing the shot control button. For non-trigger control and monitoring system firearm or air gun devices, the range finder is activated by one of the buttons on the firearm or air guns scope. The range finder also has a weather station that records wind speed, humidity, and air pressure.

Automatic Ballistics Crosshair—

Prior to shot simulation, the reticle on the firearm or air guns scope is electronically positioned in the field-of-view of the scope. After ranging the shot the positions of the horizontal and vertical axis of the reticle are automatically repositioned in the field-of-view based on target range, bullet ballistics, wind and muzzle incline/decline. The new cross-hair, based on the repositioned reticles, becomes the shooters target alignment point. The reticle is typically not displayed when the gun is not in use. When the gun is moved to roughly a horizontal position the reticle appears.

User Control Interface—

The proposed scope includes a plurality of buttons and selection knobs (FIG. 1) that allow the user to configure, manage, and operate the scope. These buttons and knobs are the interface for the user. Some of the variables that can be input through these controls are at least: Power On/Off, shot control button, wind direction and speed, gun type, ammunition type, reticle type, and configuration of other user preferences.

The windage knob and button on the User Control Interface allow the selection of Configuration Mode. This mode displays a menu which is scrolled by twisting the windage knob and selected by pressing the windage knob's button. Two additional features are selectable from this menu:—Single-Shot Automatic Alignment Mode and Ammo Select.

Single-Shot Automatic Alignment—

The proposed scope's automatic alignment capability is a significant innovation. Without this capability, a typical shooter may take a dozen or more shots and up to an hour's time aligning the scope with the muzzle. This manual process is often unreliable because of shooter jitter and trigger jerk. The proposed scope eliminates the need for mechanical alignment turrets, eliminates the need to know the range of the alignment target and eliminates error due to jitter and jerk. When in auto alignment mode, the shooter aligns the cross hair on the center of the target and presses the shot control button. If the designation-dot is on the center of the target, the shooter completes the shot by increasing trigger pressure. The shooter then lines up on the target center, presses the shot control button, moves the cross-hairs to where the round impacted the target and again presses the shot control button. The cross hairs then adjust automatically completing alignment.

Update Mode—

In this mode the proposed scope is connected to a laptop via a universal serial bus (USB) cable. In Update Mode, the scope can download new software, new ammunition information, and new rifle types.

The proposed scope can operate in Standard mode or Advanced mode. Selection of the mode is made by a switch on the side of the scope. In Standard mode, the reticles are displayed in a default location and only updated from that location if the elevation or windage knobs are moved. This mode emulates the features and actions typically found in a traditional riflescope and therefore does not synchronize the trigger or affect it in any way. In Advanced mode, all the advanced features of the scope are enabled including the Shot Simulator, Muzzle Tracking, Shot Synchronization, Automatic Ballistics Crosshair, and the other advanced features.

Figure 6:
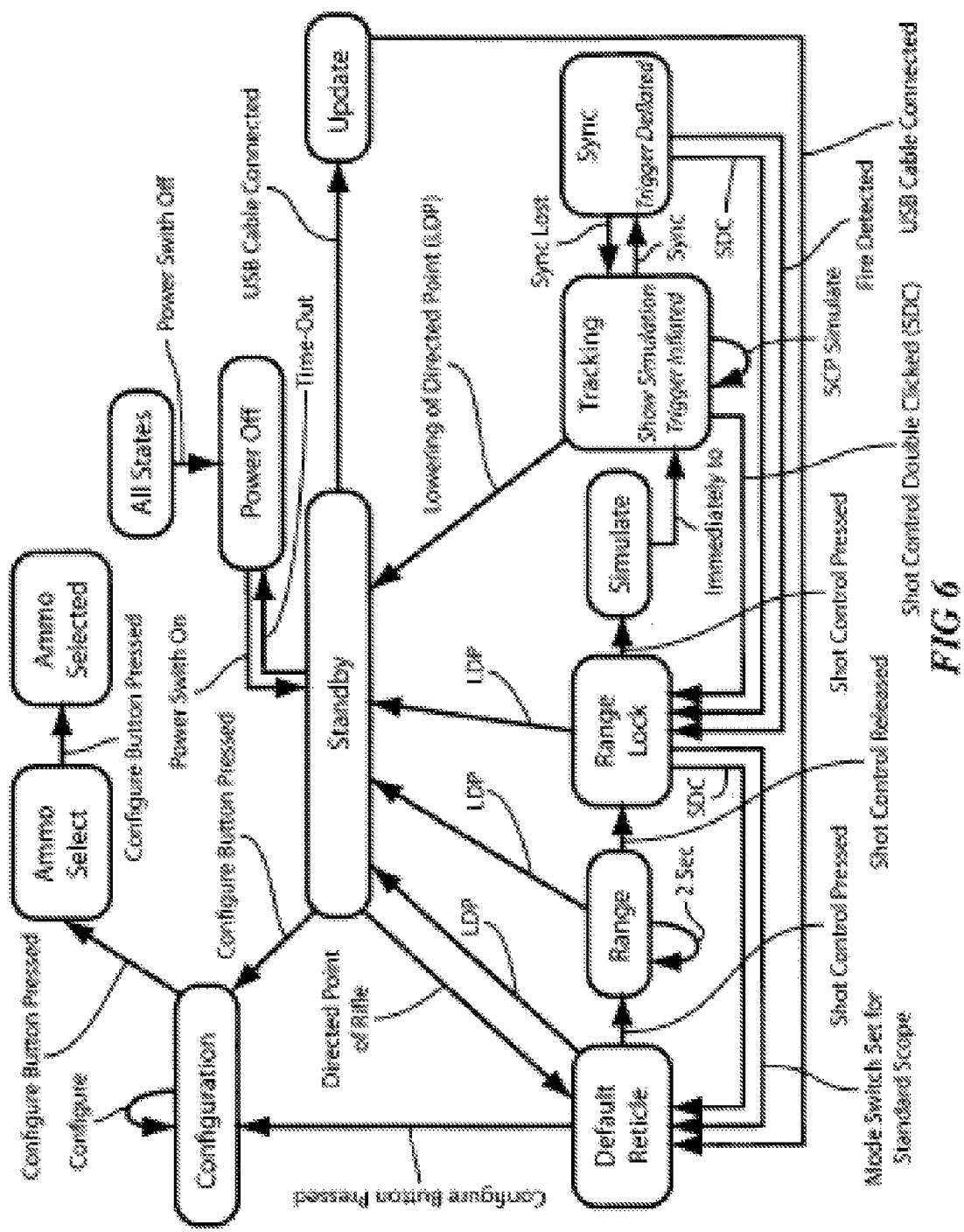
FIG. 6 is a schematic of the states of the system.

Operation in Advanced mode can be understood by reference to FIG. 6, beginning in the Power Off mode. The power up to Advanced mode is indicated by the Power Up command or PU, which is a power switch on the side of the scope. This puts the scope in standby mode. Each primary capability is then activated either through a "Directed Point," or a press of the shot control button:

Directed Point—

When the user points the rifle at a target (DP) the proposed scope detects when the gun is in a steady shooting position by monitoring the inclinometer and gyroscopes. When a Directed Point is detected, the scope automatically powers up and displays the default reticle.

Reset Action—

A double press of the Shot Control Sutton will generally abort the current action and reset the scope back to showing its default reticle.

Step 1—Ranging—

The ballistics scope built-in range finder can range targets up to 800 yards away. In hunting, once the animal is identified, the shooter will find the animal in the scope. He/she will place the cross hair on the animal and press (SCP) the shot control button. The range finder will automatically find the range. The user releases (SCR) the shot control and the range is locked in. The range is displayed in the scope field of view and the range information is used by the scope to set the ballistics reticles. If the shooter ranged on the wrong target or wants to re-start the shooting process for any reason he does a rapid double press. This rapid double press is called the "Reset Action" (SOC). The scope also reverts to the pre-shot state when the rifle is roughly vertical as detected by the inclinometer and gyroscopes.

Step 2—Taking A Simulated Shot—

The shooter moves the ballistics-adjusted crosshair to the desired designation point on the target and presses (SCP) the shot control button. A colored "designation-dot" appears in the field of view. This dot can be any color but is most likely to be set by the user for red or green. This dot is a simulation of where the bullet will impact the target. If the shooter is not satisfied with the simulated shot location he attempts once again to place the colored designation-dot on the target's desired target zone and presses the shot control button again, simulating another shot. The shooter can repeat (SCP) Step 2 multiple times if necessary. Once simulated, muzzle tracking is active and the trigger pressure is inflated. At any time, the shooter can re-start the shot by executing the Reset Action (SOC).

Step 3—Synchronized Firing—

Satisfied with the location of the impact point represented by the designation-dot, the shooter increases trigger pressure to the normal trigger pressure of the rifle (2 to 3 pounds) but the inflated trigger pressure does not allow a shot. As normal shooter jitter occurs, the cross-hair may move off the impact point, but the designation-dot will appear to remain stable on the impact point (as long as the field of view is stationary). The scope will track muzzle movement and will restrict the rifle from firing until the crosshair is realigned with the dot at which time the trigger solenoid is released and the bullet is fired. At any time the shooter can re-start the shot by executing the Reset Action (SOC). Once the rifle fires (Fire Detected) the system returns to Range Lock to for another possible shot.

FIG. 6 also exhibits the other possible system states of configuration, update, and ammo select.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit and scope of the disclosure. All such similar substitutes and modifications apparent to those skilled in the art are deemed to be within the spirit, scope, and concept of the disclosure.

What is claimed is:

1. A method comprising:
    defining a designation point on a target within a view area of a scope coupled to a firearm, the designation point remaining fixed on the target;
    determining a target range corresponding to the target;
    automatically adjusting a reticle to provide a ballistics-adjusted reticle corresponding to a calculated impact point of a bullet based on the target range, bullet ballistics, wind, and muzzle orientation;
    determining an angular motion deviation of a muzzle of the firearm from the designation point using a muzzle tracking module that includes an image sensor, an inclinometer, and one or more gyroscopes, the angular motion deviation determined based on changes to the muzzle orientation determined from the inclinometer and the one or more gyroscopes;
    detecting a trigger pull event corresponding to movement of a trigger of a synchronized trigger mechanism of the firearm; and
    initiating firing of the firearm electronically in response to the trigger pull by sending a signal from a control circuit of the scope to a circuit of a synchronized trigger mechanism of the firearm when the angular motion deviation of the ballistics-adjusted reticle relative to the designation point on the target is predicted to be below an acceptable level.

2. The method of claim 1, further comprising displaying the reticle within the view area.

3. The method of claim 2, wherein defining the designation point comprises receiving a signal corresponding to a user-selection of a shot control button when crosshairs of the reticle are aligned with the target.

4. The method of claim 1, determining the target range including initiating a range finding action via a laser-based range finding module.

5. The method of claim 4, wherein the range finding module further comprises a weather station that records at least one of a wind speed, a humidity, and an air pressure.

6. The method of claim 1, further comprising controlling the designation point such that the designation point remains fixed in a field of view corresponding to the view area.

7. The method of claim 1, the trigger a variable force trigger, and further comprising increasing a resistance of the variable force trigger to resist a trigger pull of the trigger pull event while the angular motion deviation of the muzzle from the designation point exceeds a threshold level.

8. The method of claim 7, further comprising reducing a trigger resistance of the variable force trigger when the angular motion deviation of the muzzle from the designation point falls below the threshold level.

9. The method of claim 7, wherein the variable force trigger includes a solenoid.

10. The method of claim 7, wherein the variable force trigger includes a nitinol wire variable force trigger.

11. A system comprising:
    a firearm scope including:
        an optical display system configured to display a reticle and to electronically reposition the reticle in the field-of-view of the firearm scope to provide a ballistics-adjusted reticle based on a target range, bullet ballistics, wind, and muzzle orientation;
        a muzzle tracking module including a gyroscope and an inclinometer to determine orientation data, the muzzle tracking module configured to use the orientation data to track an angular motion deviation of a muzzle of a firearm represented by the ballistics-adjusted reticle relative to a user-defined designation point, which remains fixed on a target within a view area of the firearm scope; and
        a processor coupled to the optical display system and the muzzle tracking module, the processor configured to predict when the ballistics-adjusted reticle will be below a threshold distance from the user-defined designation point based on the orientation data; and
    a synchronized trigger mechanism configured to receive a signal from the processor to enable firing of the firearm when the angular motion deviation of the muzzle from the user-defined designation point is predicted to be below the threshold distance and, otherwise, the synchronized trigger mechanism is configured to impede firing of the firearm when the angular motion deviation of the muzzle from the user-defined designation point is above the threshold distance.

12. The system of claim 11, wherein said muzzle tracking module further comprises:
   an image sensor.

13. The system of claim 11, wherein the synchronized trigger mechanism comprises a solenoid configured to prevent firing of the firearm in response to a control signal indicating when the angular motion deviation of the muzzle from the user-defined designation point is above the threshold level.

14. The system of claim 11, wherein the synchronized trigger mechanism comprises a nitinol wire variable force trigger configured to prevent firing when the angular motion deviation of the muzzle from the angular position designation point is above the threshold level.

15. The system of claim 11, further comprising a laser range finder.

16. A system comprising:
   a scope configured to generate a digital image corresponding to a view area of the scope and calibrated to a firearm, the scope including:
      at least one user-selectable control element accessible by a user to assign a designation point to a target in the view area;
      an optical display system configured to display a reticle and to electronically reposition the reticle in the field-of-view of the firearm scope to provide a ballistics-adjusted reticle based on a target range, bullet ballistics, wind, and muzzle orientation;
   a muzzle tracking module configured to track an angular motion deviation of the ballistics-adjusted reticle corresponding to an orientation of a muzzle of the firearm relative to the designation point; and
   a trigger mechanism communicatively coupled to the scope and configured to prevent discharge of the firearm in response to a trigger pull when the angular motion deviation of the muzzle of the firearm deviates from the designation point by an amount greater than a threshold and to receive a signal from the muzzle tracking module to allow discharge of the firearm in response to the trigger pull when the angular motion deviation of the muzzle of the firearm deviates from the designation point by less than the threshold.

17. The system of claim 16, wherein the scope further comprises one or more sensors configured to determine at least one of movement data, incline data, and orientation data corresponding to an orientation of the muzzle of the firearm.

18. The system of claim 16, wherein the trigger mechanism comprises:
   a trigger shoe;
   a sear configured to move in response to movement of the trigger shoe to discharge the firearm; and
   a blocking mechanism communicatively coupled to a control circuit of the scope and configured to selectively couple to the sear to block movement of the sear and to allow movement of the sear.

\* \* \* \* \*